Figure 1:
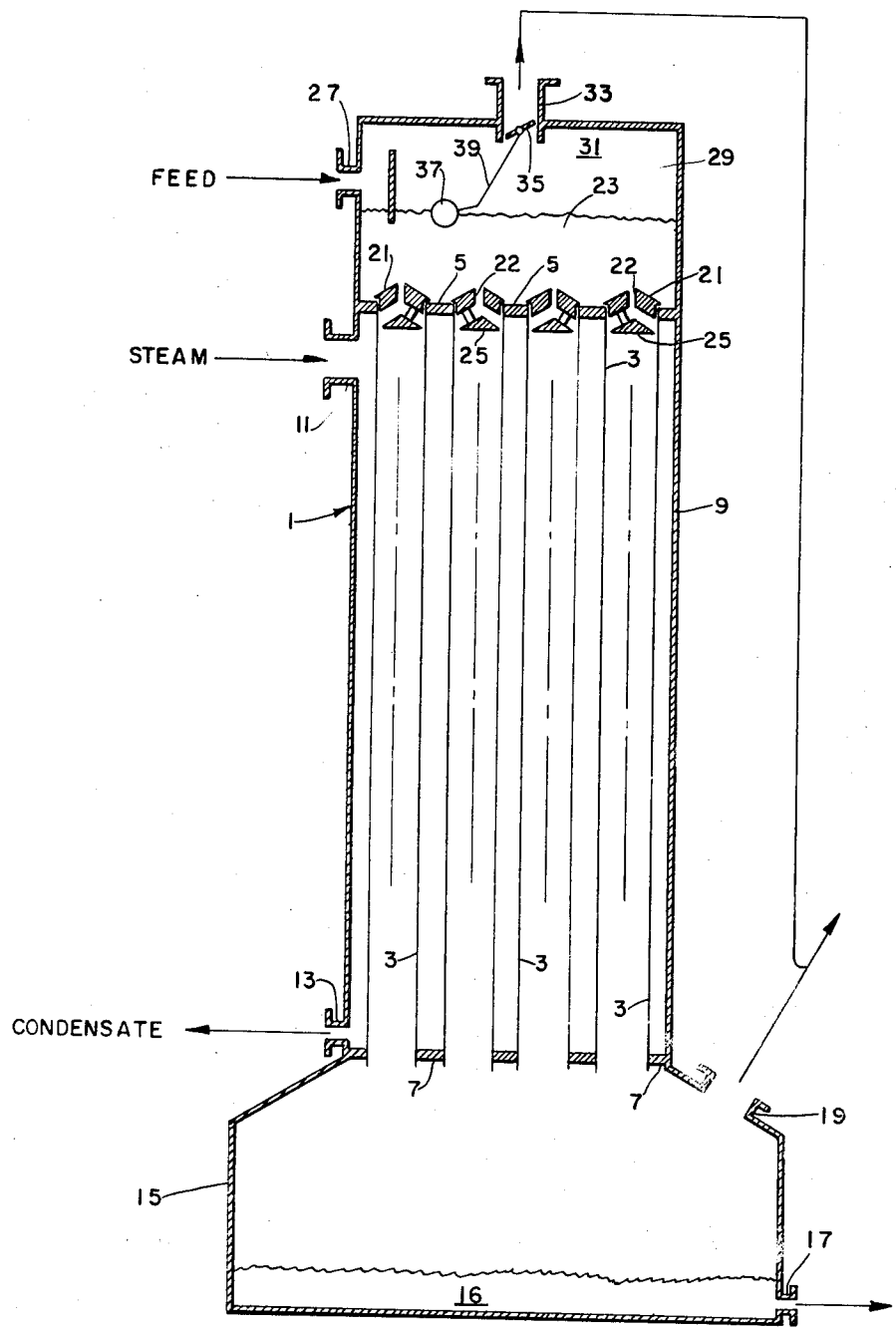

Dec. 5, 1967  F. C. STANDIFORD, JR  3,356,125
FEEDING AND LIQUID BY-PASSING METHOD FOR FALLING
FILM, MULTIPLE EFFECT EVAPORATORS
Filed Dec. 2, 1964  2 Sheets-Sheet 2

INVENTOR
Ferris C. Standiford, Jr.

BY Thomas, Weesman & Russell

ATTORNEYS

United States Patent Office 3,356,125
Patented Dec. 5, 1967

3,356,125
FEEDING AND LIQUID BY-PASSING METHOD FOR FALLING FILM, MULTIPLE EFFECT EVAPORATORS
Ferris C. Standiford, Jr., Ann Arbor, Mich., assignor to W. L. Badger Associates, Inc., Ann Arbor, Mich., a corporation of Michigan
Filed Dec. 2, 1964, Ser. No. 415,343
6 Claims. (Cl. 159—49)

This invention relates generally to an improved evaporator of the falling film design having improved heat transfer characteristics and relative freedom from scaling.

In such evaporators, heat from condensing vapors is transmitted through a metal wall to a boiling liquid as the same flows as a film down the wall under the influence, primarily, of gravity. This metal wall, comprising the heating surface of the evaporator, is usually in the form of large diameter tubes arranged vertically in such a manner that the feed liquid will flow as a liquid film down the inside walls thereof. The feed liquid to be concentrated is introduced at the top of the vertical tubes about their inside periphery so that both the vapor generated and the concentrated residual liquid are discharged at the lower end of the tubes. When production demands require the use of evaporators with appreciable capacity, a large number of tubes providing additional heat transfer surfaces is needed and it then becomes a problem to insure that the feed liquid is evenly distributed amongst the tubes. When the feed is unevenly distributed, evaporation in the tubes receiving less than the designed feed rate often causes the liquid to evaporate to dryness, or else, to become so highly overconcentrated as to promote scale formation or otherwise deposit solids on the tube walls. Such scale deposits, of course, not only decrease the effective heat transfer areas and hence reduce the over-all efficiency of the evaporation operation, but, and even more importantly, create the more troublesome problems involved in periodic shut-downs for the purpose of scale removal.

Problems of this nature becomes most acute in evaporators connected together and operated as a multiple effect with forward feed. In such a scheme of operation, the feed to an intermediate effect is taken from the partially concentrated liquid residue from the immediately adjoining effect preceding same and the total pressure within the intermediate effect is lower than the vapor pressure corresponding to the temperature of the feed liquid. In these cases, the feed has a tendency to flash and liberate large volumes of vapor until the sensible heat removed from the feed and transformed into latent heat of vaporization has reduced the temperature of the feed to a level such that the vapor pressure of the feed approximates the evaporator pressure.

As the flashing occurs in situ, the vapor thus formed carries with it entrained liquid; and it is in this mixture, usually of a non-uniform composition, which is at least in part responsible for the difficulties in obtaining uniform liquid distribution to all tubes.

One means which has been used to achieve uniform distribution in such circumstances has been the installation of an orifice at the inlet of each tube, so sized as to create a back pressure sufficient to prevent flashing. However, as is usually the case, a relatively small orifice is needed, with the consequence that even small particles of suspended matter may cause plugging thereof. Also, an orifice, in restricting the cross-sectional area of a line having a non-compressible liquid flowing therein, causes a pressure drop which increases as the square of the flow rate. This type of orifice, to be effective, must be sized so as to avoid flashing at minimum flow rates. It must of necessity be quite small, which inherently not only limits the capacity of the evaporators but also necessitates the use of a powerful feed pump to overcome the pressure drop across the orifice.

It is therefore a primary object of this invention to provide an improved evaporator of the falling film type wherein tubes of such arrangement are so designed as to substantially improve the over-all heat transfer characteristics thereof when a liquid interface is maintained above the tube entrance.

Another objective of the invention is to provide an improved falling film evaporator design which will insure a uniform feed distribution to the tubes of the evaporator such that when the boiling feed enters at a temperature and a pressure higher than that of the evaporator effect being fed.

It is a further object of this invention to provide a falling film evaporator, in accordance with the foregoing objects, wherein restrictions employed at the entrance of evaporator tubes to secure uniform liquid distribution therein, have a sufficiently large cross-sectional area so as to have a decreased tendency to become obstructed.

Still another objective of the invention is to provide a falling film evaporator having, at the entrance of the evaporator tubes, a restricting orifice designed to provide a uniform liquid distribution therein over a wide range of feed rates; such improved liquid distribution being attained without either an unduly large pressure drop across the orifice or an appreciable penalty in a power consumption.

Another essential feature of my invention is the provision of an improved multiple effect falling film evaporator system having a forward feed which, when utilized in the manner described herein, transforms whatever degree of superheat the entering feed liquid may possess by flash evaporation of same until the vapor pressure of the feed approximates that of the evaporator pressure.

An additional objective of the invention is the provision of a falling film evaporator designed to virtually eliminate the superheat from the liquid feed prior to its entry into the heat transfer tubes and to remove the flash vapor which has caused the dissipation of the superheat so that it is prevented from entering the heat transfer tubes.

Another object of the invention is the provision of a falling film evaporator which is operated in such manner as to assure that a vapor liquid interface is maintained above the entrance to the heat transfer tubes so that the static head of this liquid affords the principal driving force for the feed distribution to the tube walls.

Figure 2:
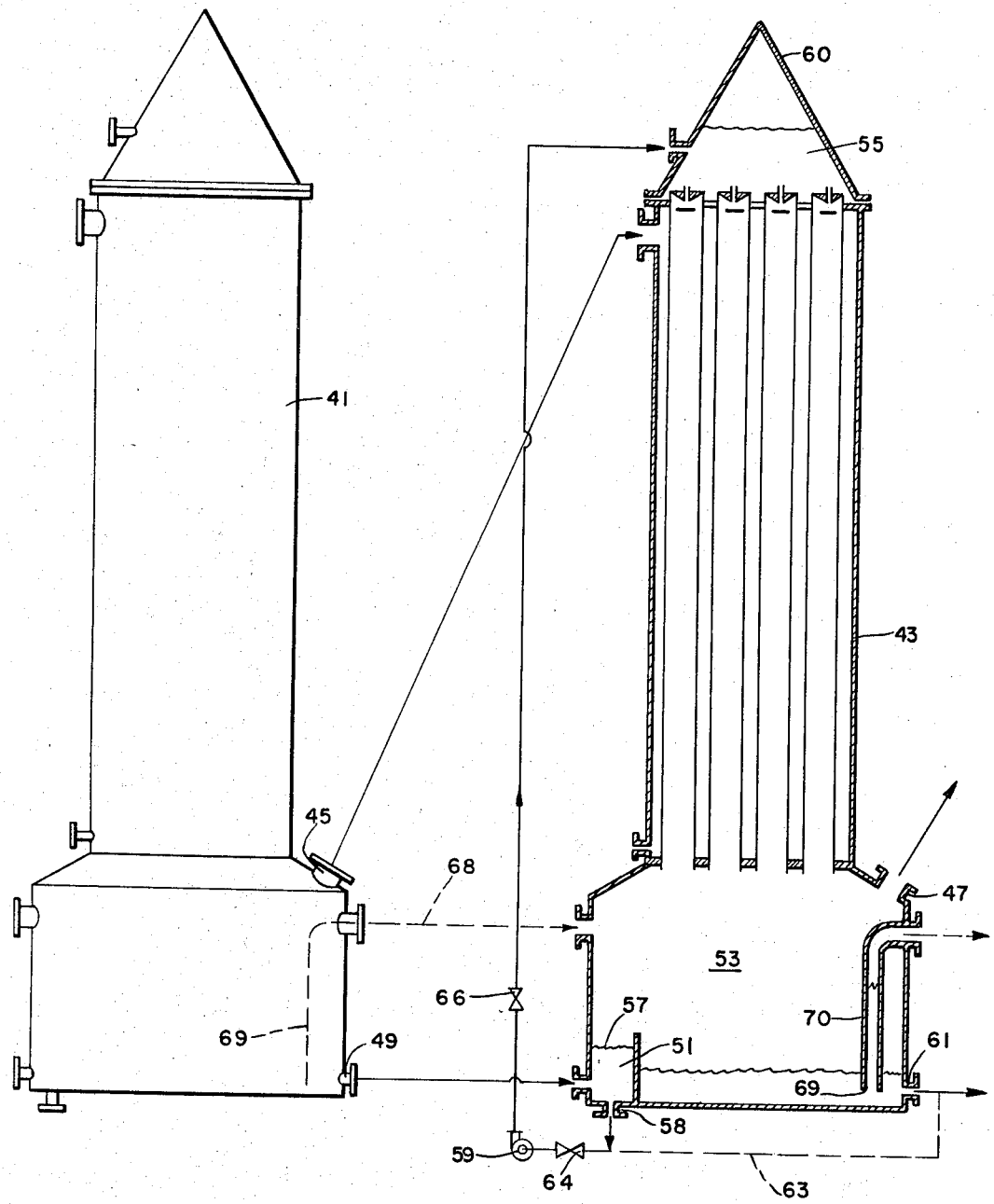

Further objects and advantages of the improvement described herein will become apparent from the following more detailed description, made with reference to the accompanying drawings, wherein like numerals indicate like parts and wherein:

FIGURE 1 is a side diagrammatic view of one falling film evaporator in a multiple effect system, constructed in accordance with this invention, and illustrating particularly the heat transfer tubes restricted by an orifice at the entrance thereto and also indicating the flash chambers located above the tubes with the level of the liquid being concentrated, as shown, during the normal operation thereof; and FIGURE 2 is a side diagrammatic view of several connected evaporators in a multiple effect system illustrating the flow pattern therebetween and an alternate arrangement wherein the chamber in which the flashing is allowed to occur is located below the tube exits.

In one form of the invention, as in FIGURE 1, an intermediate effect of a forward feed, multiple effect, falling film evaporator, is generally indicated at 1. It comprises vertical tubes 3, serving as heat transfer surfaces, which are secured and expanded into the upper tube sheet 5 and lower tube sheets 7. A cylindrical shell 9 surrounds tubes 3 and is provided with a line 11 from the vapor zone of the preceding effect to which steam generated therein is supplied to the exterior of tubes 3. Steam condensate, after giving up the latent heat of vaporization to the liquid film, streams down the outside surface of tubes 3, and drains to the tube sheet 7 where it is then removed through line 13.

The receiver 15, formed at the bottom of the evaporator, is designed to separate the vapor formed inside tubes 3, generated by the action of the condensing steam, from the residual liquid derived from the falling film. The concentrated residual liquids 16, leave the reservoir via line 17, and the vapor formed in the tubes, leaves by line 19. Both liquid and vapor are thus transported to evaporator effects boiling at still lower temperatures.

The pressure in receiver 15 is generally governed by heat transfer conditions in the following effect and substantially this same pressure also exists throughout the length of tubes 3, this pressure being only slightly higher near the upper end of the tubes due to the pressure drop concomitant with the flow of vapor generated in the tubes. Since the pressure in the evaporator governs the boiling temperature of the liquid, providing, of course, that the solute concentration in the tubes is not changed substantially, the boiling temperature of the liquid film in any one evaporator is substantially constant throughout the entire length of the tube.

With reference to the entrance end of the tubes 3, it will be noted that restrictors 21 are placed at the uppermost end of the tubes so as to distribute feed liquid to the tube walls and also to restrict the flow to such a degree that a pool of liquid 23 may be maintained above the tubes. Many types of distributors may be used for this purpose, but the type here shown is commonly referred to as the Vogt distributors, typified by U.S. Patent No. 2,424,441. In particular such arrangement consists of a restricting orifice 22 protruding above the tube inlet and a splash plate 25 lying immediately below the orifice and designed to deflect, in a predetermined manner, the stream issuing from the orifice on to the tube walls.

In the usual application of like distributors to this type of evaporator arrangement, restrictions 22 must be quite small or else sufficient back pressure will not be developed to keep the superheated feed liquid from flashing.

In my invention, as shown in FIGURE 1, the feed liquid entering from line 27 begins to flash once in chamber 29, creating a relatively quiescent pool of liquid 23 and a vapor space 31 above the liquid surface. The flash vapor formed is led off through line 33 to join the vapor 19 issuing from the exit of the receiver 15. In the preferred embodiment of my invention, line 33 is so sized that under normal operating conditions there is little pressure drop therein and hence the pressure in vapor space 31 is substantially the same as the pressure in receiver 15 and also in the tubes. As a consequence of the equalized pressures throughout the system, the only driving force, by way of a pressure differential available for forcing feed liquid through orifice 22, is that force due to the hydrostatic head of liquid 23 above the orifice. The hydrostatic head of liquid may, under certain operation conditions, be quite low, in which case, it will permit the use of larger orifices.

To the extent that the hydraulic gradient due to the flow of feed liquid across the tube sheet will in some measure impede the feed to the tubes, it is only necessary to provide a few feet of hydrostatic head of liquid, or else, a small head, which in any event, is large as compared to the hydraulic gradient across the tube sheet. This gradient will be a variable quantity and the same dependent upon the size of the tube sheet, the feed rate, and the method of introducing feed. Since the actual hydrostatic head above the restriction 22 nearer the feed inlet 27, is higher than the head above similar restrictions further from the feed inlet, care must be taken to avoid non-uniform feed distribution so that the hydraulic gradient across the tube sheet is not appreciable relative to the hydrostatic head at points furthest from the feed entrance.

When evaporators are designed to operate at higher feed rates, additional means may be employed to control the level of liquid 23. The primary reason for this is that the pressure drop across restriction 22 varies approximately as the square of the flow rate therethrough, which, translated into a more concrete example, means that a two fold increase in the flow rate would require a liquid static head four times as high. As is readily apparent, if hydrostatic head were the only available source of pressure, the hydrostatic head required at high flow rates might become so high as to require an excessively high chamber.

An optional feature of my invention, which may be used to resolve the above problem, is the incorporation of a restriction in flash vapor line 33. The butterfly valve 35, shown in FIGURE 1, and exemplifying a means of restricting the vapor line 33, is operated by float 37. A linkage 39, connecting the float to the butterfly valve, is designed to partially close the valve as the level of liquid 23 rises in chamber 29. It is then possible to throttle the flow of discharging flash vapor to raise the pressure in the vapor space above that in the tubes so that this pressure differential will provide an auxiliary driving force to aid in obtaining higher flow rates through restriction 22. However, vapor restriction 35 is shown as an automatically controlled valve, and the same, for the majority of applications, may be unnecessary. This is principally because increased feed rates are generally accompanied by the formation of more flash vapor which will result in a higher vapor flow and an attendant greater pressure drop across even a fixed vapor restriction. Thus, restriction 33 may alternatively be an orifice, or a hand operated valve in line 33, or such restriction may even be secured simply by reducing the size of line 33.

In connection with the use of the butterfly valve 33, or any other means designed to increase the pressure above the liquid and the flow of liquid in the tubes, it is to be noted that the entering feed will flash evaporate to reduce the liquid temperature until the vapor pressure of the feed liquid approximates that of the reduced pressure in chamber 29. Since the pressure in the tube will be somewhat lower than that in the chamber 29, the feed standing in pool 23 above the tubes will be superheated with respect to its boiling point at the pressure in the tubes. Superheated feed entering the tubes does not as effectively absorb the heat being transmitted through the tubes' walls as when the temperature of the entering feed is at its boiling point under the pressure conditions within the tubes, and hence, as is obvious, increased pressures in chamber 31 are necessarily accompanied by less efficient heat transfer. Although the mechanism responsible for this reduced heat transfer is not completely known, it is hypothecated that it may be caused by the failure of this flashing fluid to immediately establish a proper film on the tube walls.

FIGURE 2 illustrates two effects of a forward feed flowing film evaporator employing yet another optional form of my invention. Evaporator 41, which is operated at the higher temperatures of the two effects shown in outline form, is of a construction similar to that of the lower temperature effect 43 shown in cross section. Vapor generated in the higher temperature effect is connected by line 45 to the area between the tubes of evaporator 43 forming the steam chests therein and this vapor serves as the heating steam for the lower temperature effect. The vapor generated in the lower temperature effect is led off through line 47 to the following effect, or to a condenser in the event this is the last effect of the evaporators. Similarly, the residual liquid from the higher temperature effect is led off by line 49 to serve as feed for the lower temperature effect.

In contrast to the scheme proposed in FIGURE 1, liquid in this case is introduced into a partition section 51 of receiver 53, rather than being pumped directly to chamber 55 in effect 43. As a result, liquid from line 49 which is superheated by the pressure in 53, is flash cooled and the flashed vapor thus generated leaves at 57 to join the vapor generated by evaporation in the tubes of effect 43. The resultant flash cooled liquid is then withdrawn through line 58 by pump 59 for delivery to feed chamber 55. As shown in FIGURE 2, chamber 55 is depicted as a tall column having the advantage that it permits large variations in hydrostatic head at a negligible cost, and the use of such a cone is possible because there is substantially no flash vaporization therein.

After steady state operation is achieved, the pressure drop across the orifice will be equalized by whatever liquid head is necessary to force the feed through the restrictions at the two inlets, and the space above the liquid will be occupied by a stagnant body of vapor formed initially by flashing of feed over an infinitesimally small temperature range. It is obvious that the large variations in pressure drop made possible by using a tall cone 60 could alternatively be achieved, in a manner similar to that shown in FIGURE 1, by imposing a restriction in vapor passage 57. In still another embodiment of this invention chamber 51 is dispensed with and a feed liquid entering by line 49 mixes with liquid issuing from the tubes into chamber 53.

Pump 59 takes its suction from line 61, as shown by dotted line 63, and the feed liquid to the tubes of effect 43 will consequently be of the same composition as the discharge liquid to the following effect and also of a higher concentration than that of the feed entering by line 49. However, the concentration of the liquid discharging from the tubes of effect 43 will be higher than the concentration of the liquid discharged by line 61 to the following effect. Such an arrangement allows the tubes to be fed by pump 59 at a rate independent of the net feed entering by line 49. Generally, the feed rate to chamber 55 would be chosen higher than the feed rate through line 49 owing to the improved heat transfer in the tubes at higher feed rates. This arrangement would not be practical for either liquids that might deposit scale at the higher concentration, or for solutions having an appreciable boiling point elevation at slightly higher salt concentrations inasmuch as the long run scaling problems would not offset the immediate gains in better heat transfer.

The design of the flashing system of FIGURE 2 is preferable to that of FIGURE 1 in instances when one of the feed pumps, such as pump 59 for effect 43, fails for any reason. The design shown in FIGURE 2, will permit continued operation, in such an event, simply by closing valves 64 and 66. Then the liquid entering effect 43 by line 49 will overflow compartment 51, if present, into receiver 53 where it will be automatically delivered to the following effect by line 61. As a result, none of the liquid in receiver 53 will be supplied to the tubes and the pressure drop between the steam entering by line 45 and vapor space 53 will increase. In order that the remaining effects, in a multiple effect system, remain in operation, vapor must bypass the inoperative effects. A bypass of this type is shown in FIGURE 2 by dash line 68 as a pipe with its inlet end 69 sealed below the liquid level in the receiver of effect 41. Likewise, a similar line 70 is installed in the receiver 53 to bypass the following effect.

The vertical section 69 of pipe 68 is of such height that the normal pressure differential between effects 41 and 43 is insufficient of force liquid from evaporator 41 to the top of the vertical section and this height of liquid thus maintains a seal. When the pressure differential is increased above a predetermined level, the seal will rupture, thus releasing the gases therein. This creates an essentially unrestricted bypass for the vapor around the effect having an inoperative feed pump.

Although it is obvious that the principle of the invention may be varied in many ways and other expedients or alternates employed to accomplish the purposes hereof, it is to be understood that my invention is to be limited only to that scope expressed by the following claims.

I claim:

1. The method of operating a multiple effect forward feed evaporator system containing a number of falling film effects comprising passing the liquid solution effluent from one effect operating at a higher boiling pressure to a compartment in the vapor-liquid disengaging space of the next effect operating at a lower boiling pressure, said liquid solution being superheated with respect to said next effect, said next effect having a pool of liquid above the falling film heat transfer surface thereof, said compartment being in vapor communication with the vapor issuing from said next effect, transferring liquid from said compartment to said pool of liquid above the falling film heat transfer surfaces of said next effect, said compartment being arranged to overflow its contents in the event of failure of said step of transferring said liquid contents, and diverting the vapor from said effect operating at a higher boiling pressure to the next further effect in said event of failure of said step of transferring said liquid contents.

2. In a falling film forward flow multiple effect evaporator system in which each effect has upper and lower chambers, each chamber having a liquid space and a vapor space thereabove, the method of operating said evaporator system comprising passing the liquid solution effluent from the lower chamber of one effect operating at a higher boiling pressure as feed to the upper chamber of the next effect operating at a lower boiling pressure, said solution being superheated, maintaining a pool of liquid in the said upper chamber of each of said effects during operative periods thereof above the falling film heat transfer surfaces thereof, said lower chamber of said one effect being in vapor communication with the lower chamber of said next effect during periods of non-operativeness of said next effect, transferring liquid from the liquid space of said lower chamber of said one effect to said upper liquid space of said next effect, thereby directing the vapor from said one effect operating at a higher boiling pressure to the next further effect via the lower chamber of said next effect in said event of said non-operativeness of said next effect.

3. The invention as defined in claim 2 wherein said superheated feed solution is flashed before it is passed to the evaporative surface of the tubes whereby its vapor pressure equals the evaporator pressure.

4. The invention as set forth in claim 2 wherein said pool of liquid is maintained above the inlets of said falling film heat transfer surfaces in each of said effects to thereby prevent vapor from said upper chamber from entering said inlets.

5. The invention as defined in claim 1 wherein said pool of liquid is of sufficient depth to offset the effect of hydraulic gradients across the tube sheet on uniform feed distribution to the tubes.

6. The invention as defined in claim 2 wherein said pool of liquid is of sufficient depth to offset the effect of hydraulic gradients across the tube sheet on uniform feed distribution to the tubes.

(References on following page)

References Cited

UNITED STATES PATENTS

| | | | |
|---|---|---|---|
| 1,717,927 | 6/1929 | Hughes et al. | 159—13 |
| 2,580,646 | 1/1952 | Belden | 159—13 X |
| 2,753,932 | 7/1956 | Eckstrom et al. | 159—13 |
| 2,758,061 | 8/1956 | Geller | 202—236 X |
| 3,216,480 | 11/1965 | Schilt | 159—13 |
| 3,258,060 | 6/1966 | Chirico | 159—2 |

FOREIGN PATENTS

| | | |
|---|---|---|
| 202,722 | 7/1956 | Australia. |
| 904,812 | 11/1945 | France. |
| 956,086 | 4/1964 | Great Britain. |

NORMAN YUDKOFF, *Primary Examiner.*

J. SOFER, *Assistant Examiner.*